(No Model.) 7 Sheets—Sheet 1.
E. CRIPPEN.
COMBINED WATER TOWER AND EXTENSION LADDER.
No. 423,135. Patented Mar. 11, 1890.
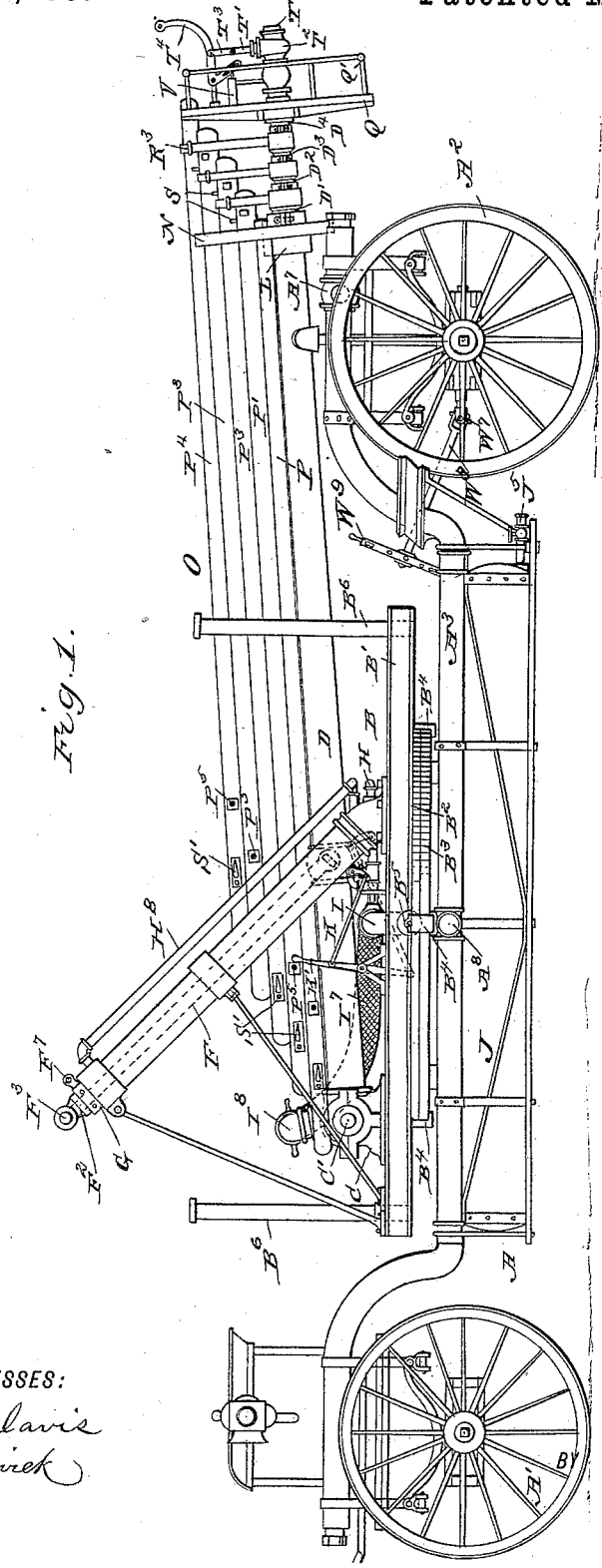
WITNESSES:
W. R. Davis
C. Sedgwick
INVENTOR:
E. Crippen
BY Munn & Co.
ATTORNEYS.

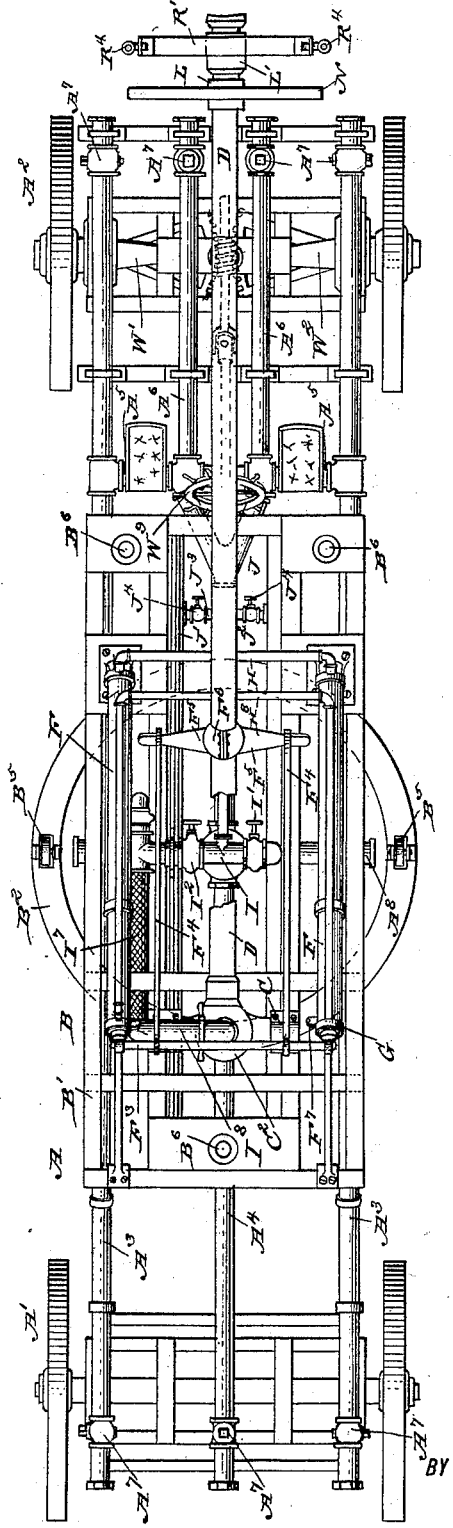

(No Model.) 7 Sheets—Sheet 3.
E. CRIPPEN.
COMBINED WATER TOWER AND EXTENSION LADDER.
No. 423,135. Patented Mar. 11, 1890.
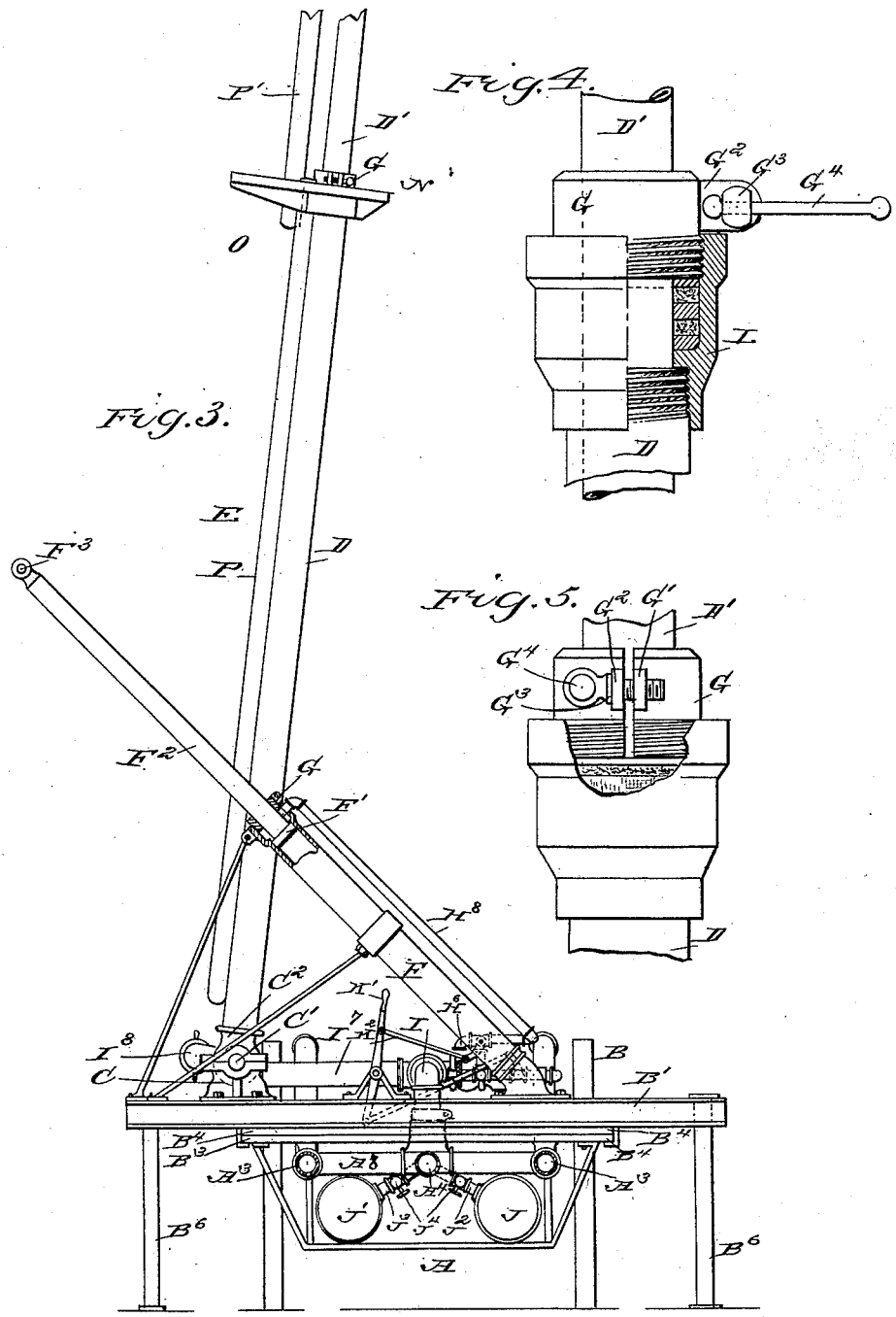
WITNESSES:
INVENTOR:
BY
ATTORNEYS.

(No Model.) 7 Sheets—Sheet 4.
E. CRIPPEN.
COMBINED WATER TOWER AND EXTENSION LADDER.
No. 423,135. Patented Mar. 11, 1890.
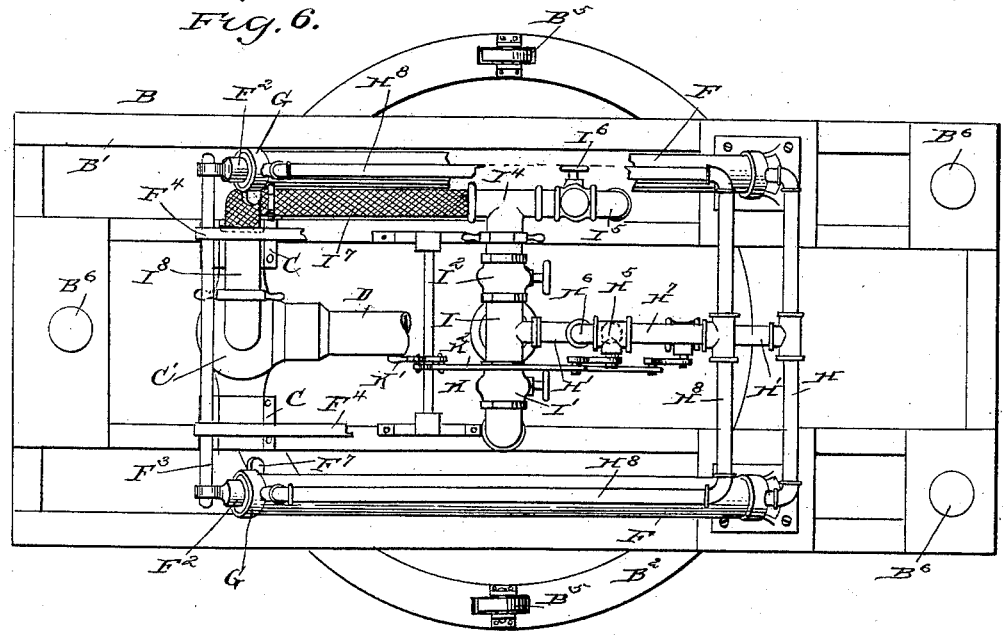
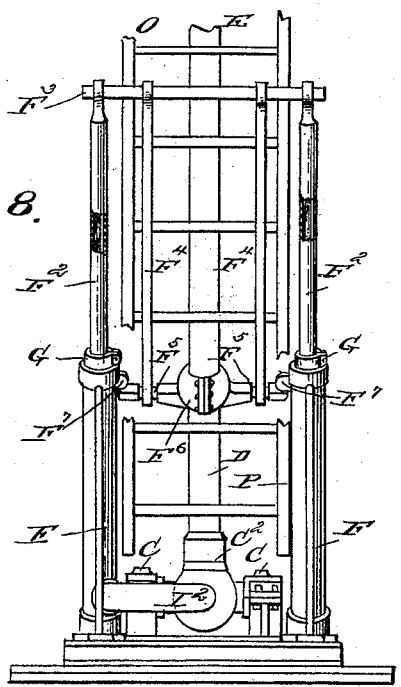
WITNESSES:
N. R. Davis.
Wm W. Luyster
INVENTOR:
E. Crippen
BY Munn & Co
ATTORNEYS.

(No Model.) 7 Sheets—Sheet 5.
E. CRIPPEN.
COMBINED WATER TOWER AND EXTENSION LADDER.
No. 423,135. Patented Mar. 11, 1890.
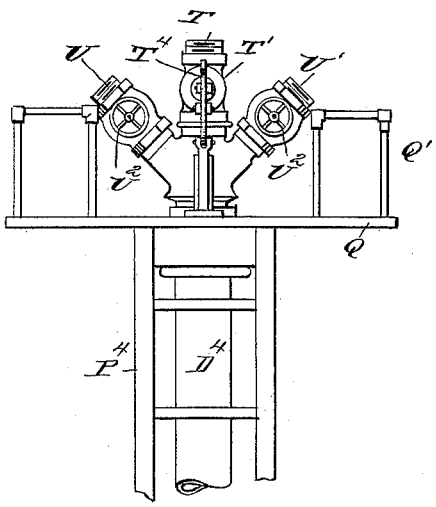
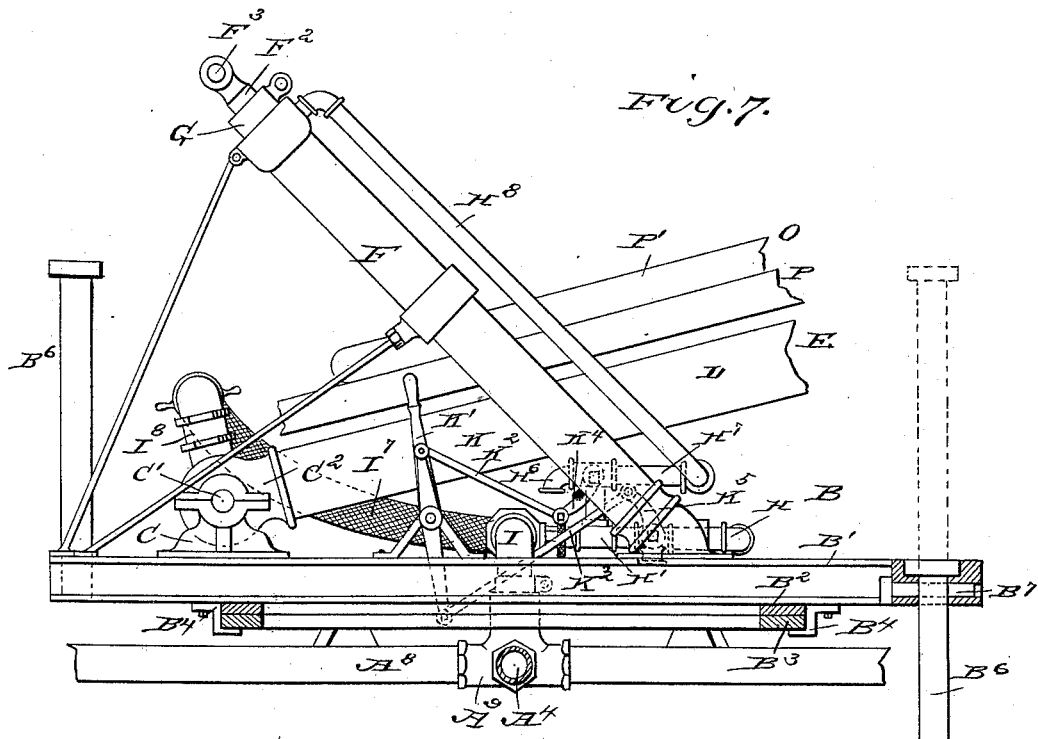
WITNESSES:
INVENTOR:
E. Crippen
BY Munn & Co
ATTORNEYS.

(No Model.) 7 Sheets—Sheet 6.
E. CRIPPEN.
COMBINED WATER TOWER AND EXTENSION LADDER.
No. 423,135. Patented Mar. 11, 1890.
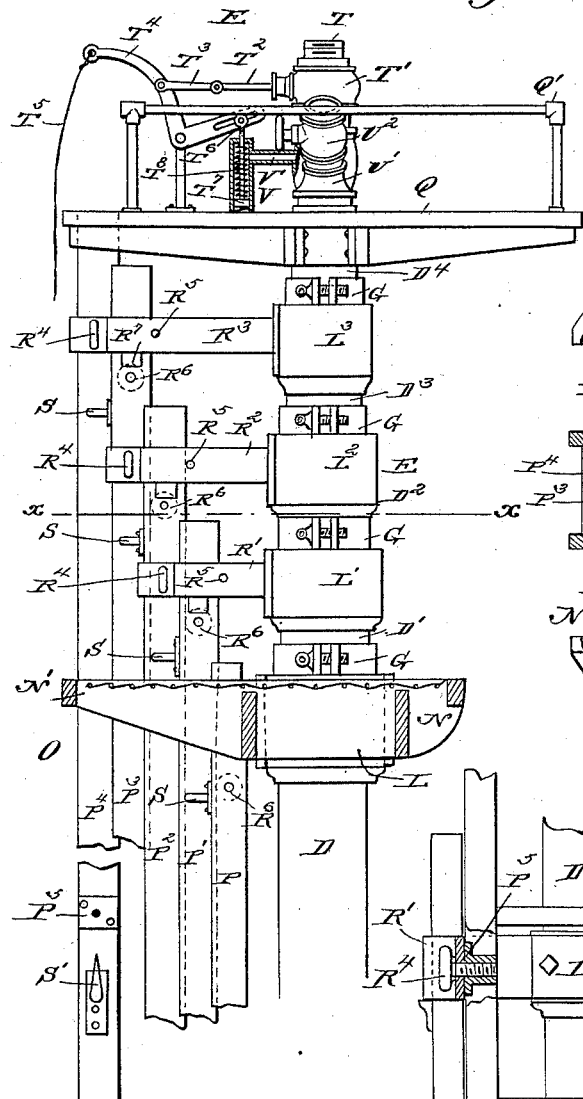
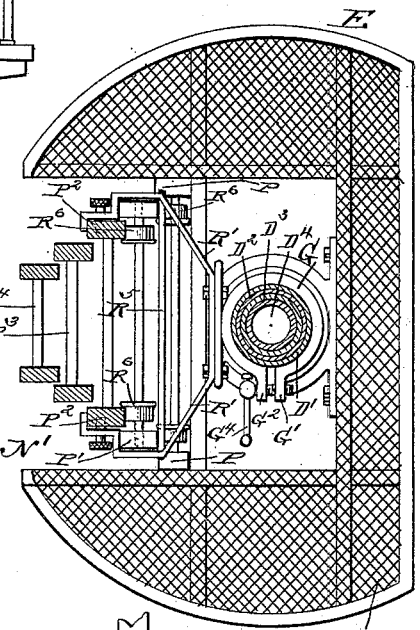
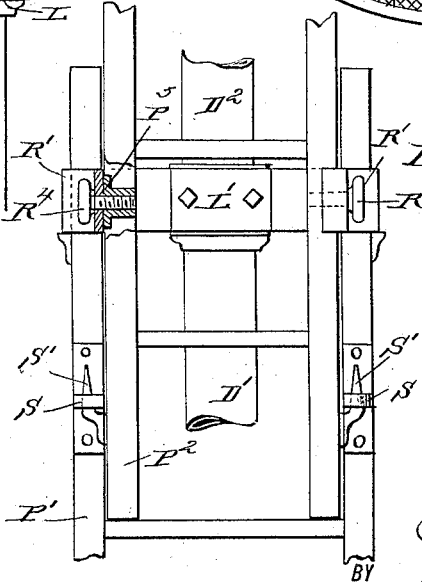
WITNESSES:
INVENTOR:
ATTORNEYS.

(No Model.) 7 Sheets—Sheet 7.
E. CRIPPEN.
COMBINED WATER TOWER AND EXTENSION LADDER.
No. 423,135. Patented Mar. 11, 1890.
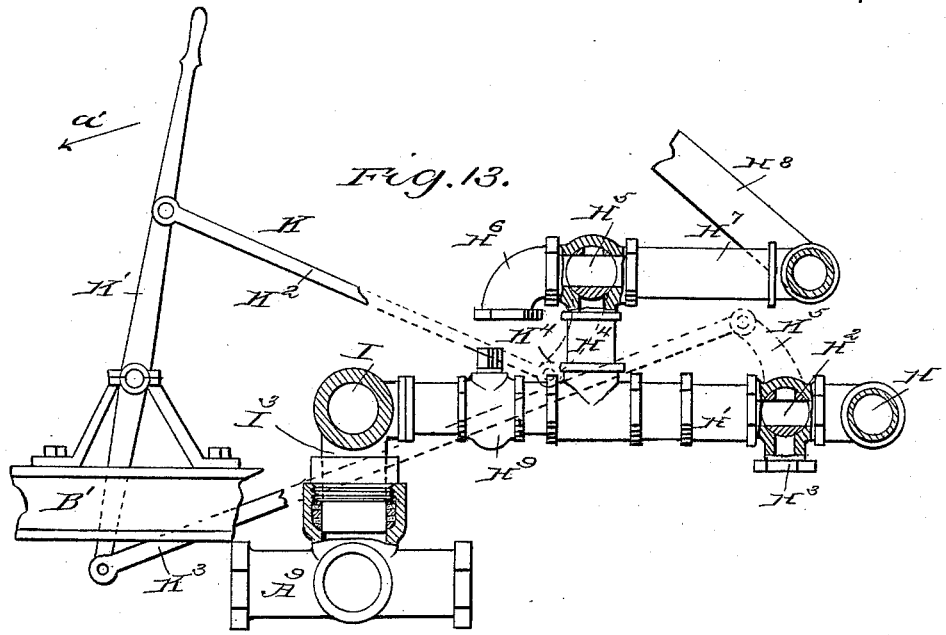
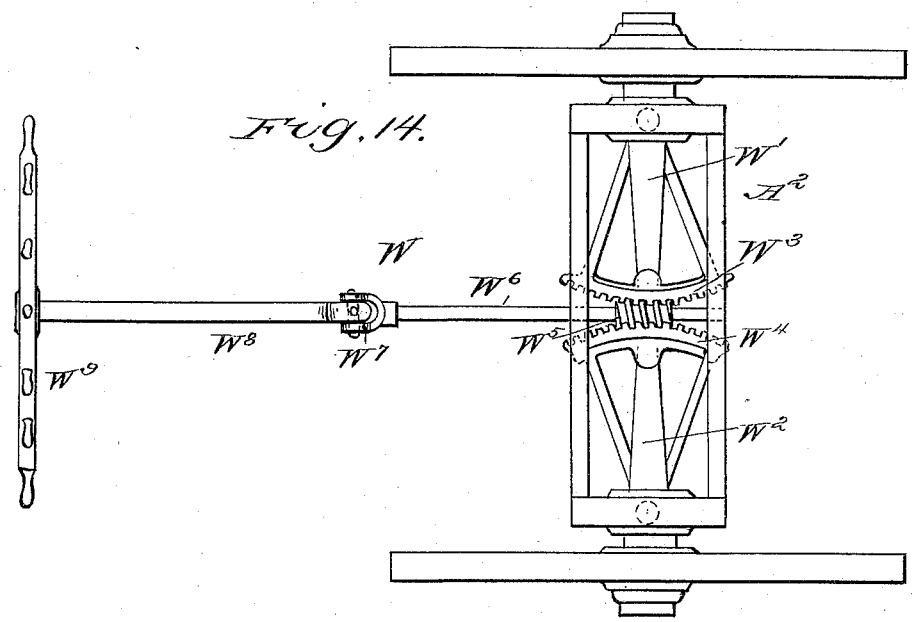
WITNESSES:
INVENTOR:
E. Crippen
BY Munn & Co
ATTORNEYS.

UNITED STATES PATENT OFFICE.

EDWIN CRIPPEN, OF NEW ORLEANS, LOUISIANA, ASSIGNOR OF THREE-EIGHTHS TO PHILIP J. REILLY, OF SAME PLACE.

COMBINED WATER-TOWER AND EXTENSION-LADDER.

SPECIFICATION forming part of Letters Patent No. 423,135, dated March 11, 1890.

Application filed October 19, 1889. Serial No. 327,573. (No model.)

*To all whom it may concern:*

Be it known that I, EDWIN CRIPPEN, of New Orleans, in the parish of Orleans and State of Louisiana, have invented a new and Improved Combined Water-Tower and Extension-Ladder, of which the following is a full, clear, and exact description.

The object of the invention is to provide a new and improved combined water-tower and extension-ladder to facilitate the extinguishing of fires, to enable firemen and other persons to climb to an elevation, and to conveniently support the persons at an elevation for observation and other purposes.

The invention consists in certain parts and details and combinations of the same, as will be described hereinafter, and then pointed out in the claims.

Reference is to be had to the accompanying drawings, forming a part of this specification, in which similar letters of reference indicate corresponding parts in all the figures.

Figure 1 is a side elevation of the improvement as folded up. Fig. 2 is a plan view of the same. Fig. 3 is an end elevation of the same with parts in section and in an extended and raised position. Fig. 4 is an enlarged front elevation, with parts in section, of the packing and gland of the water-tower. Fig. 5 is a side view of the same with parts broken out. Fig. 6 is an enlarged plan view of part of the improvement in a folded position and with parts removed. Fig. 7 is a side elevation of the same with parts in section. Fig. 8 is an end elevation of the lower end of the water-tower and extension-ladder in an extended and raised position. Fig. 9 is a like view of the upper part of the same. Fig. 10 is an enlarged side elevation of the upper end of the tower and ladder with parts in section. Fig. 11 is a sectional plan view of the same on the line $x\,x$ of Fig. 10. Fig. 12 is a front elevation with parts in section, showing the connection between two successive ladders and part of the water-tower. Fig. 13 is a side elevation with parts in section, illustrating the arrangement of the pipes and their valves and means for operating the same; and Fig. 14 is an enlarged plan view of the steering apparatus for the rear running-gear.

The improvement is preferably mounted on a truck A, provided with a front running-gear $A'$ and a rear running-gear $A^2$, connected with each other by pipes $A^3$, bent downward between the front and rear wheels to form a platform on which the water-tower is supported. A pipe $A^4$ is located between the pipes $A^3$, and extends from the front running-gear $A'$ to a cross-pipe $A^5$, connecting the pipes $A^3$ with each other near the rear running-gear $A^2$. From the cross-pipe $A^5$ extend rearward two pipes $A^6$, terminating at the rear end of the rear running-gear $A^2$, in line with the rear ends of the pipe $A^3$. Each of the pipes $A^3$ is provided near each outer end with a valve $A^7$, for opening and closing the pipe at either end, and similar valves $A^7$ are held in the front end of the pipe $A^4$ and the rear ends of the pipes $A^6$. Next to the valves $A^7$ are arranged suitable couplings for connecting the several pipes $A^3$, $A^4$, and $A^6$ with hose running to a fire-engine or other suitable source of water-supply. The three pipes $A^3$ and $A^4$ are connected with each other near the middle by a transverse pipe $A^8$.

On the lower parts of the pipes $A^3$, $A^4$, and $A^8$, between the front and rear running-gears $A'$ and $A^2$ of the truck A, is held a turn-table B, provided with a platform $B'$, supporting on its under side a ring $B^2$, mounted to travel on a similar ring $B^3$, secured on top of the pipes $A^3$ and $A^4$. Guide-blocks $B^4$ are fastened to the under side of the platform $B'$ and extend under the fixed ring $B^3$, so as to hold the turn-table B in place on the rim $B^3$. Friction-rollers $B^5$ are mounted to turn in the ring $B^2$ and travel on top of the ring $B^3$, so as to reduce friction to a minimum when the turn-table B is turned into a right-angular position with regard to the pipes $A^3$ and $A^4$. In the ends of the platform $B'$ of the turn-table B are held the legs $B^6$, adapted to rest on the ground when the turn-table is turned into an angular position and adapted to be supported in an uppermost position when the turn-table is in its normal position. A suitable bolt or lock $B^7$ (see Fig. 7) is employed to hold the legs $B^6$ in the two different positions above mentioned.

Near one end of the platform $B'$ of the turn-table B are secured the bearings C, in which are mounted to turn the trunnions C', formed on a cap $C^2$, on which is fastened the lower end of the exterior pipe D of the water-tower E, which is composed, principally, of the telescoping pipes D, D', $D^2$, $D^3$, and $D^4$, as shown in the drawings; but any number of such telescoping pipes may be employed.

On the rear end of the platform B' of the turn-table B are secured the forwardly and upwardly inclined cylinders F, held in place by suitable braces secured to the turn-table platform B'. (See Figs. 3 and 7.) In each of the cylinders F is held to slide a piston F', provided with an outwardly-extending hollow piston-rod $F^2$, passing through a suitable gland G. (Shown in detail in Figs. 4 and 5.) Each of the glands G is made of a split ring provided on its lower end with a screw-thread screwing in one of the cylinders F, and from the ends of the rim project the lugs G' and $G^2$, connected with each other by a screw $G^3$, adapted to be turned by a suitable handle $G^4$, so that the split ring may be loosened or tightened on the hollow piston-rod $F^2$, so as to prevent any leakage and to fasten the piston-rod in place when it is extended. The two hollow piston-rods $F^2$ of the cylinders F are connected with each other on their outer ends by a cross-bar $F^3$, pivotally connected by the links $F^4$ with the trunnions $F^5$, formed on the links $F^6$, bolted on the exterior pipe D of the water-tower E. When the latter is in a folded position, the pistons F' in the cylinders F are in their lowermost position, and when the pistons are moved outward, by means hereinafter more fully described, then the links $F^4$ pull on the trunnions $F^5$ and raise the water-tower E into a vertical position, said water-tower swinging on the trunnions C' in the fixed bearing C, held on the turn-table B. When the tower E has been erected, the bolts or screws $G^3$ of the glands G are screwed up by turning the handles $G^4$ so that the glands G bind on the pistons $F^2$ and hold the latter in place.

Into the lower ends of the cylinders F F open the ends of the transversely-extending pipe H, connected with a branch pipe H', in which is held a three-way valve $H^2$, adapted to connect the said pipe H with the branch pipe H', and also to connect said pipe H with a short outlet-pipe $H^3$, opening into the outer air. From the branch pipe H' extends upward a short pipe $H^4$, leading to a three-way valve $H^5$, adapted to connect said pipe $H^4$ with an outlet-pipe $H^6$, opening to the outer air, or with a pipe $H^7$, leading into a U-shaped pipe $H^8$, connected at its ends with the upper ends of the cylinders F. In the pipe H' in front of the short pipe $H^4$ is held a valve $H^9$, and the said pipe H' is connected with a transversely-extending pipe I, held over the center of the turn-table B and provided on each side of the pipe H' with valves I' and $I^2$, respectively. The valve I' is adapted to connect the pipe I with the outer air, and the valve $I^2$ is adapted to connect the pipe I' with a pipe $I^4$, containing a valve $I^6$, from which extends an outlet-pipe $I^5$. The pipe $I^4$ also connects with a flexible hose $I^7$, leading to a pipe $I^8$, opening into the cap C', supporting the lower end of the exterior pipe D of the water-tower E.

From the pipe I extends downward a short pipe $I^3$, opening into the cross $A^9$ of the transverse pipe A, connecting the pipes $A^3$ with the central pipe $A^4$. The latter is connected with reservoirs J and J' by means of the pipes $J^2$ and $J^3$, each of which carries a valve $J^4$. The reservoirs J and J' extend longitudinally and are secured by suitable brackets to the under side of the fixed ring $B^3$, supported by the pipes $A^3$ and $A^4$, as previously mentioned. The short pipe $I^3$ is adapted to turn in suitable bearings formed in the cross $A^9$, as is plainly shown in Fig. 13, so that as the turn-table B is turned the connection between the pipe I and the cross $A^9$, and consequently the connection with the pipes $A^3$ and $A^4$, is unaltered.

The reservoirs J and J' are charged with a suitable compressed air, which can be admitted into the central pipe $A^4$, from the latter into the pipe I, then into the pipe H', through the three-way valve $H^2$, and into the pipe H, so as to pass from the latter into the lower ends of the cylinders F. The compressed air, acting on the pistons F' in the said cylinders F, forces said pistons outward, thus moving the tower into a vertical position, as previously described. When this takes place, the valve $H^5$ closes the pipe $H^4$ and connects the pipe $H^7$ with the outlet $H^6$, so that air in the upper parts of the cylinders F can escape to the outer air by passing through the pipe $H^8$ into the pipe $H^7$, through the three-way valve $H^5$ into the outlet $H^6$, and to the open air. When the positions of the valves $H^2$ and $H^5$ are reversed, the said three-way valve $H^2$ closes the pipe H' and connects the pipe H with the outlet $H^3$. The three-way valve $H^5$ then connects the pipe $H^4$ with the pipe $H^7$, and the compressed air passing through the pipe I into the pipe H' passes from the latter through the pipe $H^4$ and the three-way valve $H^5$ into the pipes $H^7$ and $H^8$, so that the compressed air acts on the top of the pistons F' in the cylinders F, thus forcing the latter downward and thereby lowering the tower E.

The valves $H^2$ and $H^5$ are operated simultaneously by a mechanism K under the control of the operator. The mechanism K comprises a lever K', fulcrumed on a suitable bracket on the platform B' of the turn-table B, and is pivotally connected at opposite sides of its fulcrum with the links $K^2$ and $K^3$, of which the link $K^2$ is pivoted to an arm $K^4$, secured on the valve-stem of the three-way valve $H^5$, while the other link $K^3$ is pivotally connected to an arm $K^5$, held on the valve-stem of the three-way valve $H^2$. When the lever K' is in the position shown in Fig. 13, the three-way valve $H^2$ connects the pipe H' with pipe H, and the three-way valve $H^5$ connects the pipe $H^7$ with the outlet-pipe H⁶. Now, when the operator moves the lever K′ in the direction of the arrow $a'$, then the three-way valve H² closes the pipe H′ and connects the pipe H with the outlet H³. At the same time the three-way valve H⁵ closes the outlet H⁶ and connects the pipe H⁴ with the pipe H⁷, for the purposes previously described.

On the upper ends of the extension-pipes D, D′, D², and D³ are secured the packing-heads L, L′, L², and L³, respectively, each of which carries suitable packing, on top of which is held a gland G, similar to the one previously described. The gland G screws in the respective head, as is plainly shown in Figs. 4 and 5, and when the respective pipe is extended it can be fastened in place on the next lower one by turning the handle G⁴, so as to press the split gland G together, thus binding the extended pipe.

On the head L on the upper end of the exterior pipe D is secured a platform N, provided with a recess N′, through which passes the extension-ladder O, made of a series of sections P, P′, P², P³, and P⁴, of which the latter or outermost section is secured at its upper end to a platform Q, fastened on the upper end of the interior pipe D⁴ of the tower E. The first ladder-section P is secured at its upper end to the platform N and at its lower end to the lower part of the exterior pipe D. The sections P′, P², P³, and P⁴ diminish in width, as is plainly shown in Fig. 11, and the said sections are guided in braces R′, R², and R³, secured to the heads L′, L², and L³, respectively. Near the upper end of each side of each ladder-section P³, P², P′, and P is secured a staple S, adapted to be engaged by a correspondingly-shaped hook S′, secured to the sides of the ladder-sections P⁴, P³, P², and P′, respectively. In the outer ends of the brackets R³, R², and R′ screw the screws R⁴, adapted to engage corresponding apertures formed in the plates P⁵, secured on the sides of the ladder-sections P⁴, P³, P², and P′, when the said sections are extended.

In order to ease the sliding movement of the several sections when extended, the ladder-sections P³, P², and P′ are held loosely in place in their respective brackets R³, R², and R′ by transversely-extending rods R⁵, passing in rear of the upper ends of the said sections, as plainly shown in Figs. 10 and 11. By withdrawing the rods R⁵ the several ladder-sections P³ P² P′ may be easily removed for repair when necessary.

The top platform Q on the upper end of the interior pipe D⁴ is provided with a suitable railing Q′. From the upper end of the interior pipe D⁴ extends a short pipe T, from which diverge the branch pipes U and U′, each of the latter being provided with an ordinary valve U². To the outer ends of the pipes T, U, and U′ may be coupled ordinary nozzles turned in any direction by the firemen standing on the top of the platform Q.

In the pipe T is held a valve T′, connected at the outer end of its valve-stem T² by a link T³ with one arm of a bell-crank lever T⁴, to which is secured a rope T⁵, extending to the ground. In the other arm of the bell-crank lever T⁴ is formed a slot engaged by the outer end of a piston-rod T⁶, extending into the cylinder V, held on top of the platform Q. On the inner end of the piston-rod T⁶ in the cylinder V is held a piston T⁷, on which presses a spring T⁸, coiled around the piston-rod T⁶ and serving to press said piston and its rod downward.

Into the upper end of the cylinder V leads a short branch pipe V′, opening into the pipe T below its valve T′. The valve T′ can be opened from the ground by pulling on the rope T⁵, so that the bell-crank lever T⁴ swings outward and by its link T³ pulls the valve-stem T², carrying the valve T′, outward. When the operator releases the pull on the rope T⁵, the valve T′ seats itself automatically by the action of the spring T⁸, pressing the piston T⁷ and the rod T⁶ downward. It will be seen that the fluid passing through the pipe T also passes through the short branch pipe V′ into the cylinder V and on top of the piston T⁷, so that the pressure of the spring T⁸ on the piston is in excess of the pressure of the fluid against the valve T′, so that the latter closes by the action of the spring.

The rear running-gear A² of the truck A is provided with a steering apparatus W. (See Fig. 14.) The axle of the rear running-gear is made in two pivoted sections W′ and W², each of which is provided at its inner end with a segmental gear-wheel W³ or W⁴, respectively, both meshing at opposite sides into a worm-wheel of right and left threads W⁵, secured on a shaft W⁶, mounted to turn in suitable bearings in the rear running-gear A². The shaft W⁶ extends inward, and is connected by a universal joint W⁷ with a shaft W⁸, slightly inclined upward and mounted to turn in suitable bearings on the rear running-gear A². On the upper end of the shaft W⁸ is held a hand-wheel W⁹, adapted to be turned by operators located in seats arranged in front of the rear running-gear wheels between the pipes A⁶ and A³, as is plainly shown in Fig. 2. It will be seen that when the operator turns the hand-wheel W⁹ the shafts W⁸ and W⁶ turn and impart a like motion to the worm W⁵, which turns the segmental gear-wheels W³ W⁴, so as to swing the axle-sections W′ and W² simultaneously in opposite directions, whereby one of the wheels turns outward and the other inward.

The operation is as follows: The reservoirs J and J′ are provided on one end with a suitable inlet J⁵, so as to permit of charging the reservoirs with compressed air to double the amount necessary to extend the tower E to its extreme height. A small air-pump mounted on the apparatus or other suitable device may be connected with the inlet J⁵, in order to charge the reservoirs J and J′. The pressure in the reservoirs is to be constant at all times, and consequently it is necessary to connect the air-pump frequently and work it long enough to compensate for the loss of compressed air by leakage or other causes. When the apparatus has been moved to the fire and it is desired to erect the tower and extend the ladder O, it is necessary to open the valves $J^4$ in the pipes $J^2$ and $J^3$, leading from the reservoirs J and J' to the central pipe $A^4$, so that the compressed air can pass from the reservoirs J and J' through the said pipes $J^2$ and $J^3$ into the central pipe $A^4$, and from the latter through the cross $A^9$ into the pipe $I^3$, and from the latter to the pipe I, into the pipe H', through the three-way valve $H^2$ into the pipe H, and from the latter into the cylinders F, so that the pistons in the same are moved outward and the folded tower E is thrown in a vertical position, as previously described. When the exterior pipe reaches a vertical position, then the outer ends of the trunnions $F^5$ strike against the lugs $F^7$ on the upper ends of the cylinders F, thus preventing further movement of the exterior pipe D. Suitable bolts or other devices may be employed to fasten the outer ends of the trunnions $F^5$ to the lugs $F^7$, so that the tower is retained in a vertical position independently of any pressure against the pistons F' in the cylinders F F. The operator now ascends the outermost section $P^4$ of the ladder to the platform N, as shown, and loosens the screw $G^3$ on the gland G on the upper end of the pipe $D^3$, so that the interior pipe $D^4$ is free to slide outward. The operator on the ground now opens the valve $I^2$ in the pipe I, while the valves I' and $I^6$ remain closed. The compressed air in the pipe I can now pass into the pipe $I^4$, from the latter through the pipe $I^7$ into the pipe $I^8$, and from the latter into the cap C', from which the air travels through the telescoping pipe and exerts its pressure against the loose pipe $D^4$, so that the latter slides outward out of the pipe $D^3$, carrying along the outermost section $P^4$ of the extension-ladder O. The pipe $D^4$ and the extension-ladder $P^4$ continue to ascend until the hooks S' on the said section $P^4$ hook into the staples S, secured near the upper end of the section $P^3$, thus stopping all further movement of the pipe and ladder, as the said section $P^3$ cannot move upward on account of the lugs $R^7$ abutting against the under sides of the brackets $R^3$, secured to the head $L^3$ of the next following pipe $D^3$. This latter pipe is held in place by the gland G on the pipe $D^2$, and in a similar manner the pipe $D^2$ is held on the pipe D', and the latter by the gland G on the pipe D. It will be seen that as the ladder-section $P^4$ is guided in the bracket $R^3$ a rotary motion of the telescoping pipe $D^4$ is prevented when the ladder is extended, as above described. When the pipe $D^4$ has been extended, the operator, standing on the platform N, tightens the gland G, so as to lock the extended pipe $D^4$ to the head $L^3$ of the pipe $D^3$. When the ladder-section $P^4$ is extended, the operator screws the bolts $R^4$ on the bracket $R^3$ inward, so that the said bolts engage the apertures in the plates $P^5$, whereby the ladder-section $P^4$ is secured to the outer end of the bracket $R^3$, and thus both the extended pipe $D^4$ and the extended ladder-section $P^4$ are locked in place. The next lower pipe $D^3$ is now extended as soon as the operator loosens the clamping-screw $G^3$ of the gland G, held in the head $L^2$ of the pipe $D^2$. The pressure of the air in the telescoping pipes now forces the pipe $D^3$ outward, so that the said pipe carries along with it the ladder-section $P^3$ until its hook S' engages the staple S of the next following ladder-section $P^2$. The above-described operation is then repeated—that is, the gland G in the head $L^2$ is operated on, so as to lock the extended pipe $D^3$ in place, and then the screw $R^4$ in the bracket $R^2$ is screwed in to lock the extended section $P^3$ in place. This operation is repeated with the other extension-pipes $D^2$ and $D^3$ until the latter, as well as the ladder-sections $P^2$ and P', are extended and locked in place. When the tower has been erected and the ladder-sections extended, then the operator on the ground closes the valves $J^4$ in the pipes $J^2$ and $J^3$, so as to prevent further escape of the compressed air from the reservoirs J and J'. The operator also closes the valve $H^9$ in the pipe H'. During the erection of the tower other members of the fire company attach hose connected with engines or other sources of water-supply to either of the pipes $A^3$, $A^4$, or $A^6$, so that when the respective valve $A^7$ in the connected pipe is opened a stream of water will flow through the said pipe into the cross-pipe $A^9$, and from the latter through the short pipe $I^3$ into the pipe I, through the same into the pipe $I^4$, the flexible hose $I^7$, the pipe $I^8$, to the cap C', and from the latter into the several pipes D, D', $D^2$, $D^3$, and $D^4$ of the extended tower E. Operators meanwhile have climbed up the several extensions of the ladder O to the platform Q and attached the usual flexible nozzle or play-pipe to the pipe T, so that when the valve T' is opened the water forced by the engines through the apparatus will pass out of the flexible nozzle or play-pipe. In case the nozzle was previously attached, then the valve T' can be opened from the ground by pulling on the rope $T^5$. It will be understood that the compressed air used for the erecting the tower escapes in advance of the water as soon as the valve T' is opened, the tower standing without any pressure in the pipes. The water is forced out of the nozzle and directed onto the fire by the operator standing on the platform Q or by guy-ropes operated in the usual manner from the ground and connected with the said nozzle. When it is necessary, two more play-pipes may be connected to the remaining branch pipes U and U' and the valves U² opened, so that water passing through the tower may be divided into three streams. The operation of lowering the tower is the reverse of extending it, the operators first closing the valve T' and shutting off the water-supply, so that the tower remains filled with water. The gland G on the exterior pipe D is slackened and the screw R⁴ on the platform N is unscrewed from the plate P⁵ of the section P', after which the valve I⁶ in the pipe I⁴ is opened, so that water can escape through the outlet I⁵. The telescoping pipe D' now descends until it reaches its innermost position, the next gland G on the head L' is then slackened, and the screw R⁴ in the bracket R' is screwed from the section P², so that the next pipe D² can descend in the pipe D'. The above-described operation is repeated on the several pipes until all have descended to their lowermost position. When the water has run out through the outlet I⁵, the valve I² is closed. The tower can then be lowered by the operator first removing the fastening between the lugs F⁷ and the ends of the trunnions F⁵ and then moving the lever K' in the direction of the arrow $a'$, so as to change the positions of the three-way valves H² and H⁵, after which the valve H⁹ is again opened, as are also the valves J⁴ in the pipes J² and J³, connecting the reservoirs J and J' with the pipe A⁴. The air in the cylinders F can now escape through the pipe H, the three-way valve H², and the outlet H³ to the open air, and air under pressure passes from the reservoirs J J' through the three-way valve H⁵ into the pipe H⁷, and from the latter through the pipes H⁸ to the upper ends of the cylinders F, thus forcing the pistons F' downward, whereby the tower is lowered, as previously described. The operator handling the lever K' can lower the tower very rapidly or slowly, according to the positions of the valves H² and H⁵, permitting a rapid or slow escape of air from the lower ends of the cylinders F and a rapid or slow inlet of compressed air through the three-way valve H⁵ into the upper ends of the cylinders F.

In case the tower is used without a fire-engine and has not sufficient air-pressure to lower it, it can be lowered by the glands G in the cylinders F by slacking the bolts in the said glands to just permit the piston-rods F² to slide slowly inward by the weight of the tower.

In case the device is used as an extension-ladder and the reservoirs are charged with a compressed air, the operation of erection and extension is about the same as before described, with the exception that canvas hose is fastened on each side of the tower on top and secured to the railing Q' on the platform Q. The tower and ladder are then extended to the height necessary to reach either a window or the roof of a building. The hose attached to the railing Q' can be led across the roofs of buildings and used to throw a stream.

The extension-ladder can be turned in any desired direction by the operator taking hold of the legs B⁶, so as to turn the turn-table B until it stands at angles to the pipes A³. The legs B⁶ are then let down to the ground and fixed by any ordinary means, so as to steady the platform B'. The tower and the extension-ladder may then be inclined by the operator handling the lever K', so that the upper part of the extension-ladder or tower may lean against the building, thus forming a means of communication from the upper part of the building to the ground.

Having thus fully described my invention, I claim as new and desire to secure by Letters Patent—

1. The combination, with telescoping pipes forming a water-tower, of split glands for locking the several pipes in place, substantially as shown and described.

2. The combination, with telescoping pipes forming a water-tower, of a split gland held on the end of each telescoping pipe and a screw for clamping the said split clamp onto the next following telescoping pipe, substantially as shown and described.

3. The combination, with telescoping pipes forming a water-tower, and of which the exterior pipe is pivoted at one end, of moving pistons pivotally connected with the said exterior pipe above its fulcrum and split glands for locking the said pistons in place, substantially as shown and described.

4. The combination, with telescoping pipes forming a water-tower, and of which the exterior pipe is pivoted at one end, of moving pistons pivotally connected with the said exterior pipe above its fulcrum, and fixed inclined cylinders in which travel the said pistons by the action of compressed air passed into the said cylinders, substantially as shown and described.

5. The combination, with telescoping pipes forming a water-tower, and of which the exterior pipe is pivoted at one end, of moving pistons pivotally connected with the said exterior pipe above its fulcrum, fixed inclined cylinders in which travel the said pistons by the action of compressed air passed into the said cylinders, and intermediate mechanism, substantially as described, for pivotally connecting the said pistons with the said exterior pipe, as set forth.

6. The combination, with telescoping pipes forming a water-tower, and of which the exterior pipe is pivoted at one end, of moving pistons pivotally connected with the said exterior pipe above its fulcrum, means, substantially as described, for locking the said pistons in place, and fixed inclined cylinders in which travel the said pistons by the action of compressed air passed into the said cylinders, substantially as shown and described.

7. The combination, with telescoping pipes forming a water-tower, and of which the exterior pipe is pivoted at one end, of moving pistons pivotally connected with the said exterior pipe above its fulcrum, fixed inclined cylinders in which travel the said pistons, and reservoirs charged with compressed air and connected with the said fixed cylinders, substantially as shown and described.

8. The combination, with telescoping pipes forming a water-tower, and of which the exterior pipe is provided with solid trunnions, of a pipe connected with the said exterior pipe between the said trunnions to force air under pressure into the said telescoping pipes, substantially as shown and described.

9. The combination, with telescoping pipes forming a water-tower, and of which the exterior pipe is pivoted at one end, of links pivotally connected with the said exterior pipe above its fulcrum, piston-rods pivotally connected with the said links, pistons held on the said piston-rods, and fixed inclined cylinders in which operate the said pistons, substantially as shown and described.

10. The combination, with telescoping pipes forming a water-tower, and of which the exterior pipe is pivoted at one end, of links pivotally connected with the said exterior pipe above its fulcrum, piston-rods pivotally connected with the said links, pistons held on the said piston-rods, fixed inclined cylinders in which operate the said pistons, and reservoirs charged with compressed air adapted to be connected with the said cylinders, substantially as shown and described.

11. The combination, with telescoping pipes forming a water-tower, and of which the exterior pipe is pivoted at one end, of links pivotally connected with the said exterior pipe above its fulcrum, piston-rods pivotally connected with the said links, pistons held on the said piston-rods, fixed inclined cylinders in which operate the said pistons, reservoirs charged with compressed air adapted to be connected with both ends of the said cylinders, and mechanism, substantially as shown and described, for controlling the flow of compressed air to and from both ends of the cylinders, as set forth.

12. The combination, with telescoping pipes forming a water-tower, and of which the exterior pipe is pivoted at one end, of links pivotally connected with the said exterior pipe above its fulcrum, piston-rods pivotally connected with the said links, pistons held on the said piston-rods, fixed inclined cylinders in which operate the said pistons, and split glands held on the said cylinders and adapted to be clamped upon the said piston-rods, substantially as shown and described.

13. The combination, with telescoping pipes forming a water-tower, and of which the exterior pipe is pivoted at one end, of links pivotally connected with the said exterior pipe above its fulcrum, piston-rods pivotally connected with the said links, pistons held on the said piston-rods, fixed inclined cylinders in which operate the said pistons, and means, substantially as described, for locking the said exterior pipe to the said cylinders, as set forth.

14. The combination, with telescoping pipes forming a water-tower, of an extension-ladder comprising a series of sections, of which one section is secured to the central telescoping pipe, and hooks and staples held on the said sections, and of which the hooks of one section are adapted to engage the staples of the next following section, substantially as shown and described.

15. The combination, with telescoping pipes forming a water-tower, of an extension-ladder made in sections, of which one section is secured to the central telescoping pipe, hooks upon the next following section to extend the same when the telescoping pipes are extended, and screws for locking the several ladder-sections in place one on the other when extended, substantially as shown and described.

16. The combination, with telescoping pipes forming a water-tower, of an extension-ladder made in sections, of which one section is secured to the central telescoping pipe, and which sections are provided with hooks and staples, of which the hooks of one section are adapted to engage the staples of the next following sections, and guiding-brackets secured on the said telescoping pipes and guiding the said ladder-sections, substantially as shown and described.

17. An extension-ladder adapted to be extended by telescoping pipes, and comprising a series of sections provided with hooks and staples, of which the hooks of one extension are adapted to engage the staples of the next following, substantially as shown and described.

18. An extension-ladder adapted to be extended by telescoping pipes and comprising a series of sections provided with hooks and staples, of which the hooks of one extension are adapted to engage the staples of the next following, apertured plates held on the said sections, and screws screwing in fixed brackets and adapted to engage the said apertured plates to lock the ladder-sections to the said brackets, substantially as shown and described.

19. The combination, with an outlet-pipe provided with a valve, of a bell-crank lever connected with the stem of the said valve, a spring-pressed piston connected by its piston-rod with the said bell-crank lever, and a cylinder in which operates the said piston, and which is connected with the said outlet-pipe, substantially as shown and described.

20. The combination, with a turn-table, of telescoping pipes, of which the exterior pipe is pivoted at one end on the said turn-table, links pivotally connected with the said exterior pipe above its fulcrum, hollow piston-rods pivotally connected with the said links, pistons held on the said rods, and cylinders secured in an inclined position on the said turn-table, and in which move the said pistons, substantially as shown and described.

21. The combination, with telescoping pipes forming a water-tower, of a split gland held on the end of each telescoping pipe, a screw for clamping the said split gland upon the next following telescoping pipe, and an extension-ladder made in sections and held on the said telescoping pipes, substantially as shown and described.

EDWIN CRIPPEN.

Witnesses:
PHILIP J. REILLY,
WILLIAM FRED. JOHNSON.